No. 887,164. PATENTED MAY 12, 1908.
L. F. WHEELESS.
HARROW.
APPLICATION FILED JAN. 4, 1908.
2 SHEETS—SHEET 1.
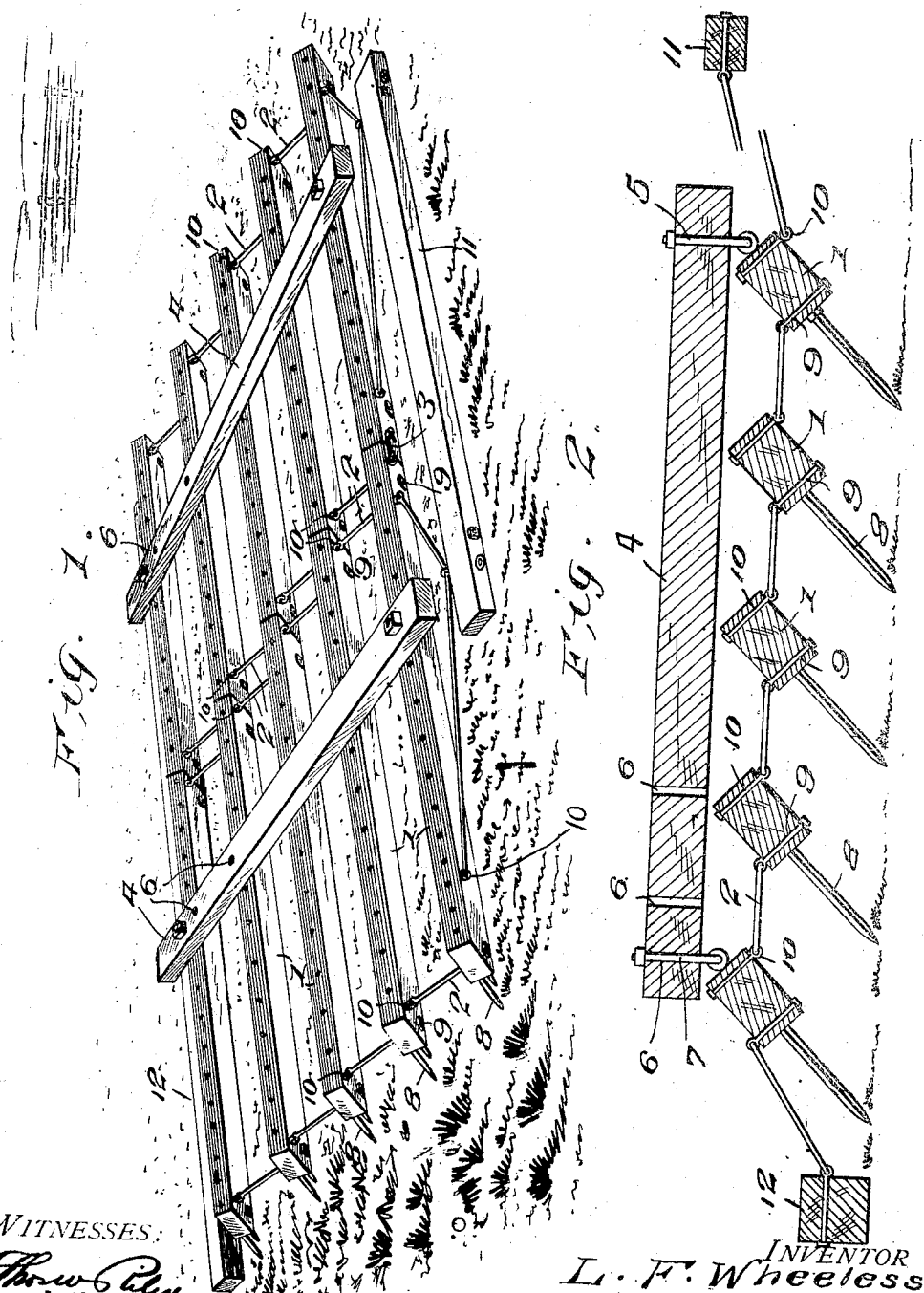

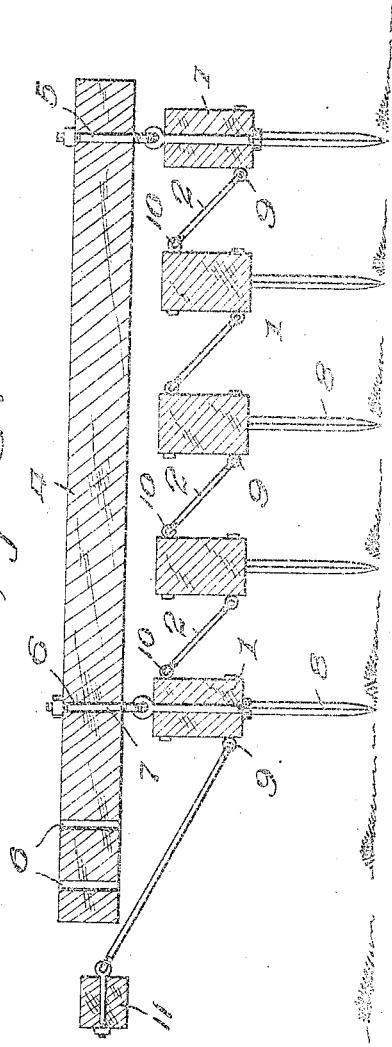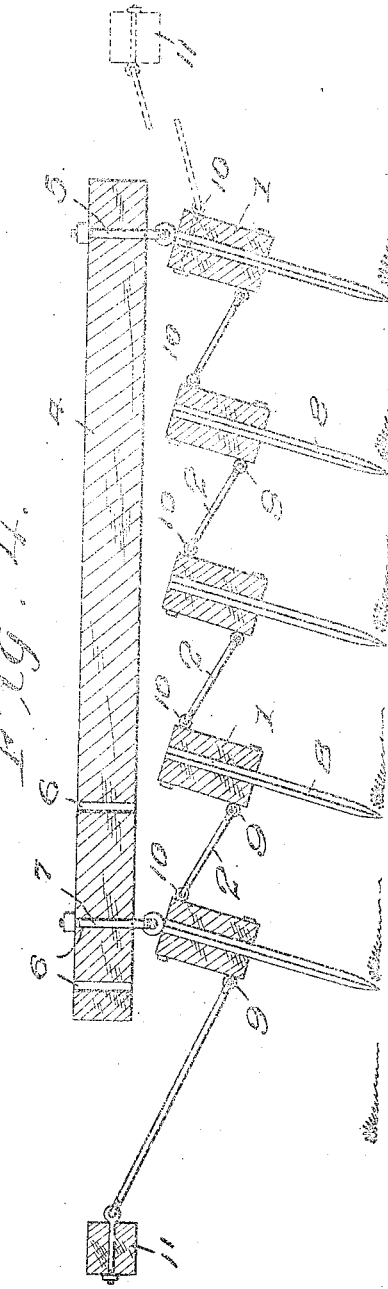

UNITED STATES PATENT OFFICE.

LORA F. WHEELESS, OF VILONIA, ARKANSAS.

HARROW.

No. 887,164.   Specification of Letters Patent.   Patented May 12, 1908.

Application filed January 4, 1908. Serial No. 409,?

*To all whom it may concern:*

Be it known that I, LORA F. WHEELESS, a citizen of the United States, residing at Vilonia, in the county of Faulkner and State of Arkansas, have invented certain new and useful Improvements in Harrows; and I do hereby declare the following to be a full, clear, and exact description of the invention, such as will enable others skilled in the art to which it appertains to make and use the same.

My invention relates to new and useful improvements in harrows, and more particularly to that class known as drag harrows and my object is to provide means for adjusting the teeth of the harrow to various angles.

A further object is to provide means for causing said teeth to drag over the surface of the soil or to dig into the same.

Other objects and advantages will be hereinafter referred to and more particularly pointed out in the claims.

In the accompanying drawings which are made a part of this application, Figure 1 is a perspective view of a harrow complete. Fig. 2 is a sectional view thereof on an enlarged scale, showing the teeth extending at an angle. Fig. 3 is a similar view, showing the teeth in a vertical position, and, Fig. 4 is a similar view showing the teeth in position to enter the soil.

Referring to the drawings in which similar reference numerals designate corresponding parts throughout the several views, 1 indicates the cross bars of my improved harrow, said beams being secured together by links 2 and, if preferred, each may be made in two sections and the right and left sections secured together by means of latches 3 placed at the meeting ends of the sections.

Extending laterally across the bars 1, are beams 4, one end of said beams being secured to one of the cross bars by means of eye bolts 5, while the opposite ends of the beams are provided with a plurality of openings 6, through which pass eye bolts 7, the object in providing the plurality of openings 6, being to cause the teeth 8, carried by the cross bars, to travel at various angles.

In securing the links between the cross bars 1, one end of the link is secured to an eye bolt 9 extending through the lower edge of the cross bar, while the opposite end of the same link is secured to an eye bolt 10 extending through the upper edge of the next succeeding cross bar and, if it is desired to give a shallow cultivation to the soil, a double tree 11 is secured to a set of eye bolts 10 at the upper edge of the beam 1 and the eye bolt 7 is placed in the opening 6 adjacent the outer ends of the beams 4, thereby separating the beams to the full extent of the links 2 and causing the teeth 8 and beams to which they are secured, to rest at an angle, as best shown in Fig. 2, in which event the teeth will slide over the surface of the soil without entering the same to any great depth, thus adapting the harrow for surface cultivation in connection with growing corn, or similar plants. If, however, it is desired to stir the soil and give a medium depth of cultivation, the bolts 7 are engaged with the innermost opening 6 in the beams 4, which will result in disposing the teeth and beams carrying the same to a vertical position, as shown in Fig. 3 of the drawings and, in this instance, the double tree 11 is secured to the opposite edge of the harrow and to the eye bolts 9 in the lower edge of the beam 1, while, if desired to give a deep and thorough cultivation to the soil, the eye bolts 7 are placed in the middle opening 6, thereby giving the teeth a slight forward slant, so that said teeth will readily enter the soil when the harrow is operated in the manner shown in Fig. 4.

In conjunction with the harrow, a drag for leveling the soil may be readily provided by attaching to the rear eye bolts, a bar 12 and, by making said bar of sufficient weight, the surface of the soil will be thoroughly pulverized, as well as smoothed, so that the furrows made by the teeth will be obliterated.

It will thus be seen that I have provided a very cheap and economical form of harrow and one wherein the teeth may be readily adjusted to cultivate the soil at various depths. It will further be seen that my improved form of harrow may be very cheaply and, at the same time, strongly constructed and, by securing the bar thereto, as shown, a drag will be provided for pulverizing the soil in the rear of the harrow.

What I claim is:

1. In a harrow of the class described, the combination with a plurality of cross bars, teeth on said cross bars, links between said cross bars, the opposite ends of said links being secured to opposite edges of the cross bars; of beams extending across the cross bars, eye bolts adapted to secure one end of the beams to one of the cross bars, the opposite ends of said beams having a series of openings therein and eye bolts carried by one of the cross bars adapted to be disposed, respectively through said openings and adjust the teeth at various angles.

2. The herein described harrow, comprising the combination with a plurality of cross bars, teeth carried by said bars, links secured at one end to the lower edge of one of the bars and the opposite end to the upper edge of the next succeeding bar, beams extending laterally across the cross bars, said beams having a series of openings in one end, means to pivotally secure the opposite ends of the beams to one of the cross bars, additional means carried by the bar at the opposite edge of the harrow adapted to enter said openings and adjust the angle of the teeth and a double tree adapted to be secured at opposite edges of the harrow.

In testimony whereof I have signed my name to this specification in the presence of two subscribing witnesses.

LORA F. WHEELESS.

Witnesses:
T. F. FORREST,
J. W. DALLAS.